United States Patent [19]

Uehara et al.

[11] 4,381,946

[45] May 3, 1983

[54] INK COMPOSITION FOR INK-JET RECORDING

[75] Inventors: Masafumi Uehara; Mitsuyoshi Itano, both of Hino, Japan

[73] Assignee: Konishiroku Photo Industry Co., Ltd., Tokyo, Japan

[21] Appl. No.: 237,605

[22] Filed: Feb. 24, 1981

[30] Foreign Application Priority Data

Feb. 25, 1980 [JP] Japan .................................. 55-23016

[51] Int. Cl.$^3$ ............................................ C09D 11/02
[52] U.S. Cl. ..................................................... 106/22
[58] Field of Search .......................................... 106/22

[56] References Cited

U.S. PATENT DOCUMENTS 3,705,043 12/1972 Zabiak .................................. 106/20
4,176,361 11/1979 Kawada et al. ....................... 106/20
4,279,653 7/1981 Makishima et al. ................... 106/22

*Primary Examiner*—Lorenzo B. Hayes
*Assistant Examiner*—Amelia B. Yarbrough
*Attorney, Agent, or Firm*—Jordan B. Bierman; Linda Bierman

[57] ABSTRACT

The present invention relates to an ink composition for ink-jet recording. The ink is an aqueous solution comprising a water soluble acid or direct dye or mixtures thereof and a compound selected from the class of polyhydric alcohols having 1-4 carbon atoms, hexylene glycol, triethylene glycol, di-propylene glycol and 1,2,6-hexanetriol. The composition of this invention has a viscosity of from 4-20 c.p.s., a surface tension of from 40-60 dyn/cm and a specific resistance of from $5 \times 10^3 - 1 \times 10^5$ ohm cm:

6 Claims, No Drawings

INK COMPOSITION FOR INK-JET RECORDING

The present invention relates to an ink composition for ink-jet recording and more particularly, the present invention relates an aqueous ink composition for ink-jet recording process, wherein ink droplets are jetted from an orifice of the print head by impulsive decrease the volume of a pressure chamber thereof.

As the ink-jet recording system of this kind, there is known such a systems as disclosed, for example, in U.S. Pat. No. 3,946,398. According to this, the recording process consists of the following two steps; a step wherein the inner volume of the pressure chamber filled with ink is suddenly decreased by the impression of electrical driving pulse and an ink drop is jetted from the orifice, thus a single drop of ink is transferred to the recording paper by a single driving pulse, and a step to return the entire system to its original state, preparing for an succeeding ink-jetting process. As an ink composition used for this type of ink-jet printing process, as it is the case for any ink composition of other ink-jet recording system, it is required for the ink not only to cause no serious clogging at the orifice, to give a sufficient contrast to a jetted image, to cause no change in its physical or chemical properties, to cause no precipitation during storage thereof, but also for the viscosity and the surface tension thereof to be maintained within an adequate range. Particularly, the influence caused by the viscosity of the ink on ink-jet printing performance is great and in the case when ink having an improper viscosity value, which is normally predetermined according to the individual printing apparatus and the various electrical factors to be given to the apparatus, is used, various troubles are likely to be caused in the jetting and the returning steps and thus satisfactory recording would become impossible. For example, if the ink having the viscosity lower than the proper viscosity range is used, it is impossible to compensate the speed deviation of each part of ink column jetted from the orifice in the jet process, and as a result two or more of ink drops having different speeds are jetted for a single electrical driving pulse, which remarkably deteriorates the print quality. Further, in the returning step, the trouble may happen. Namely, after an ink drop is jetted, the meniscus of the ink falls for a while by a reaction and thereafter, on returning to its original position by a capillary force, if the viscosity of ink is too low, an action of ink as a damper is small and therefore, an ink meniscus passes the orifice and again is returned by surface tension, which causes vibration to the meniscus and it takes a long time for this vibration to settle down in the original balanced position. On the other hand in the case the viscosity is too high, such vibration type does not appear, nonetheless when the ink is returned by a capillary force, it takes a long time and in both cases, the time required for the meniscus to return to the original state is long and consequently the printing speed is lowered. The proper viscosity range of ink in the ink-jet system of this kind, in which no such troublesome phenomena causes, would be within 4 to 20 centipoise.

Similarly, surface tension of ink gives a big influence to ink-jet recording system of this kind and when the ink having the surface tension of improper value is used, the similar trouble happens in both jetting and returning steps and satisfactory recording becomes difficult. For example, when the ink having surface tension that is lower than the proper value is used, the shape of an ink drop is hardly kept constant and in some cases, two or more of ink drops having different speeds are jetted for a single electrical driving pulse (so-called a satellite), and further in the returning step, when the fallen ink meniscus is returned to its original position by a capillary force after an ink drop is jetted, the returning time becomes long due to the fact that a capillary force becomes small and, consequently, the frequency characteristic is worsened.

In the case where the surface tension is too high, on the contrary, in the returning step by a capillary force, the returning speed thereof is too high due to a big capillary force and consequently the ink meniscus begins to vibrate. Therefore, again, it takes a long time to settle down in the original balanced position. The proper range of the surface tension of the ink for the ink-jet system of this kind, within which no such troublesome phenomena occurs, is about 40 to 60 dyn/cm.

Further, specific resistance of ink can also effect, though the effect may be small, upon the jetting of the ink droplets in this type of ink-jet recording systems, but very great upon the ink supply system, storability of the ink and clogging of it at an orifice. In other words in order for an ink composition to have proper viscosity and surface tension it has been known that a composition containing a water-soluble dye, water, polyhydric alcohols and in addition thereto water-soluble solvent is suitable. But the ink composition composed of an aqueous solution normally contains a various kinds of inorganic salts and metallic ions due to the existence in the composition of the water-soluble dye or impurities in the water, which often interfere the performance of an ink supply system or characteristics of the ink itself. As for metals or metallic ions being usually exsist in such an aqueous ink composition, sodium, calcium, magnesium, iron, copper, lead, etc. can be mentioned. The ink thus containing a lot of metallic ions often corrodes the portions connecting to a glass orifice and to an ink supply system, and the metallic portion's for a terminal use, and in addition, metals such as calcium change into a carbonate or an oxide and then deposit in ink, and thereby clogging tends to be caused at an orifice and the ink itself is deteriorated in its storage stability. Although these metallic ions have various disadvantageous effect on the orifice and ink supply system, nevertheless the reason why the existence of such metallic ions is necessary is that a dye itself exists in the solution in the form of a metallic salt so as to be soluble in water. Also, the other metallic salts are indispensable as a stabilizer or a buffer in order for the water-soluble dye to be exist in the dissolved state stably in an aqueous solution. As stated above, either too much or no existence of metallic ion in the ink will hinder the ink performance. In an ink composition comprising, as its main ingredients, aquenous solution containing water-soluble dyes and polyhydric alcohols, it is possible to determine suitable range of the concentration of the metallic ion to be exist in an ink composition by measuring the specific resistance of said solution. That is, the preferable range of the specific resistance required for the ink composition of this type of ink-jet recording systems of water-color ink has been found to be from $5 \times 10^3$ to $1 \times 10^5 \Omega.cm$.

As for viscosity and surface tension of the ink composition these requirements have been achieved by the ink composition described in Japanese Patent Publication Open to Public Inspection No. 137,506/1976. More specifically, when an ink composition which comprises water-soluble dye, polyhydric alcohol, water and, if necessary, further a very small amount of surface active agent, is used the viscosity and the surface tension may be adjusted within the range of 4 to 20 centipoise and 40 to 60 dyn/cm² respectively. However, in the heretofore known ink composition no attempt to adjust the specific resistance has not been made.

The object of the present invention is to provide an ink composition for ink-jet recording, which has improved properties and whereby no serious clogging occurs at the orifice, no substantial changes in physical and chemical properties or no precipitate will be caused during storage, and recorded images can have sufficient contrast, and, therefore stable and clear recording can be maintained in the recording for a long period and even after the long storage.

The present invention, thus more specifically relates to an ink composition for ink-jet recording consisting of an aqueous solution comprising a water-soluble acid dye or direct dye and a polyhydric alcohol containing 1 to 4 carbon atoms, said composition having viscosity of 4 to 20 c.p.s., surface tension of 40 to 60 dyn/cm. and specific resistance of $5 \times 10^3$ to $1 \times 10^5 \Omega.cm$.

The specific resistance value of the ink composition for ink-jet recording heretofore available in the market has been less than 1000 .cm and the values of specific resistance of normal ink composition comprising a water-soluble dye, a polyhydric alcohol and water does not usually exceed 5000 .cm. When a jet test was conducted by making use of an ink composition having a low specific resistance value, clogging was often observed at orifices and the orifices were found to be clogged with ink even after the ink stayed there for a few days, and as the result further ink-jetting operations became no more possible. To cope with this problem, if the concentrations of metals and metallic ions in the ink are decreased, then the occurence of the cloggs at the orifices can also be decreased and the corrosion at the metallic position of the ink supply system can also be prevented. In consideration of preservability of ink itself and adaptability of ink to an ink-jet recording apparatus, the specific resistance desirable ranges from $5 \times 10^3$ to $1 \times 10^5$, preferably from $5 \times 10^3$ to $2 \times 10^4 \Omega.cm$.

In order to adjust the specific resistance value of the ink composition, there are the physical and the chemical methods. The physical method includes addition of metallic salts or desalting or deionizing process by purifying a dye and a solvent. As the examples thereof, there are given a process wherein water-soluble dyes are dispersed in a small amount of distilled water and only salts contained therein are dissolved out, and thereafter the dyes are filtered, the process wherein dyes are dissolved in the solvent which can dissolve only the dyes and then salts are removed out by filtration, or a process wherein dyes are put into a bag made of a cellophane film for dialysis use and then desalting process is made in distilled water. But, generally speaking, the desalting and deionization can not be made satisfactorily only by the physical process and therefore chemical process had better be combined with the above mentioned physical process.

As for the chemical process, such a process wherein washing of dyes is made by a solvent containing chelating agent; a process wherein metallic ions being present are masked by simply adding chelating agent into ink; or a process wherein purification is made under the acidic conditions in which acid is added to reacted with metallic ions of the dyes.

As the water-soluble acid and direct dye to be used for the present invention, any of the ones having solubility of more than 0.5 weight percent can be used and in case of monochromatic recording, it is preferable to use a black or blue dye to obtain the high contrast on the recording paper. For example, C.I. Acid Blacks No. 2, 7, 24, 31, 52, 107, 118, 119, 156 and C.I. Direct Blacks No. 17, 32, 38, 51 can be given as black dyes and C.I. Acid Blues No. 9, 62, 102, 104, 113, 117, 120 and C.I. Direct Blues No. 1, 6, 15, 25, 71, 86 and 226 can be given as a blue dyes and such dye can be used independently or in the combination of two or more kinds. The adding amount of these dyes is not necessarily important factor in particular when sufficient recording is obtained, however, in general, 0.5–8 weight percent is practically suitable and 1.0–5 weight percent is more preferable.

As for the polyhydric alcohols having 2 to 6 carbon atoms in the present invention, any arbitrary selected polyhydric alcohol may be used, for example, ethylene glycol, propylene glycol, trimethylene glycol, glycerol, 1,3-butane diol, 2,3-butanediol, 1,4-butanediol, diethylene glycol, 1,5-pentanediol, hexylene glycol, triethylene glycol, di-propylene glycol and 1,2,6-hexanetriol can be mentioned. These polyhydric alcohol compounds may be used either singly or in optionally selected combination.

Further, if necessary, adequate water-miscible solvent such as dioxane, acetone, cellosolves e.g., methylcellosolve, carbitols alcohols e.g., methyl alcohol, pyridine and dimethylsulfoxyd may be added to the ink com- of the present invention.

In the present invention various kinds of additives, if necessary, can be used. For example in case the composition has to be stored for a long time, it is possible to add an antiseptic agent or antimold to the composition of the present invention for the purpose to prevent or to decrease the growth of bacteria or mold therein. It has been known that various kinds of antiseptic agents are useful for this purpose and Bacillat 35 (1,3,5-hexahydro triazine derivative) sold by Hoechst AG, for example, is preferable.

Further, surface active agent may be added in order to change the surface tension of the ink composition or to improve the so-called "wetting" of the ink in the ink passage. The preferable examples thereof are given as polyoxyalkylene and alkylethers thereof which are sold as, siloxane-oxyalkylene copolymer (L-5340) by Union Carbide Co., and fluorine surface active agent (FC-430) sold by 3M, all of which are non-ionic surface active agents. Adding amount of these surface active agents is generally 1 weight percent of less based on the total amount of the ink composition and the range of 0.05 to 0.5 percent by weight is especially preferable.

Further, it is possible to add various kinds of chelating reagent for the purpose to mask the metal and metallic ion of the composition. For example, sodium gluconate, ethylenediamine tetra acetic acid (EDTA), disodium ethylenediamine tetra acetate, trisodium ethylenediamine tetra acetate, tetrasodium ethylenediamine tetra acetate and sodium salt of diethylenetriamino penta acetic acid etc. can be mentioned.

As stated above, the ink composition of the present invention is useful ink wherein no change in physical and chemical properties or no precipitate is caused during storage, no serious clogging at orifice occurs and stable and clear recording can be maintained even for the recording for the long period of time and even after the stay of ink for a long time in the ink chamber.

It is surprising the ink composition of the present invention show an excellent effect when it is used for ink-jet recording, but in the case that other polyhydric alcohol is used, the effects obtained by the present invention will not be attainable. For example, when a polypropylene glycols having relatively high polymerization degree is used, the viscosity of the ink composition becomes too high for the practical use and stable and clear recording cannot be attained.

The present invention invention is illustrated hereinbelow with reference to the following examples.

EXAMPLE 1

| Ink Composition | % by weight |
| --- | --- |
| Dye desalted by cellophane film for dialysis use | |
| C.I. Direct Balck 17 | 2.5 |
| Ethylene glycol | 43.8 |
| Diethylene glycol | 10.0 |
| Triethylene glycol | 10.0 |
| Distilled water | 33.5 |
| Bacillat 35 (antiseptic agent made by Hoechst AG) | 0.2 |

Above-listed components for an ink composition was mixed under agitation to make a homogeneous aqueous solution and this solution was then filtered through a filter having a pore size of 0.6 microns.

The ink composition thus obtained had a viscosity value of 7.3 c.p.s., surface tension of 60 dyne/cm and the specific resistance value of $8 \times 10^3 \Omega.cm$ at the normal temperature (25° C.).

The ink composition thus prepared was used in the ink-jet recording apparatus device disclosed in FIGS. 1 to 3 of U.S. Pat. No. 3,946,398 and ink-jet recording was conducted under the conditions shown below.

Parameters for Ink-jet Printing Operation:

| Printing speed | 2000 dots/sec |
| --- | --- |
| Static pressure | 0.006 psi |
| Peak pressure of the pulse | 4.83 psi |
| Pulse voltage | 80 volts |
| Pulse width | 140 us |
| Diameter of the orifice | 0.0028 inches |

As the rersult of this experiment it was found that clear and excellent print was obtainable by the use of the ink composition according to the present invention and the quality of the printed image remained unchanged after continuous recording operation for 24 hours and, furthermore, even in operation, wherein the ink composition was stored for one month in the device.

EXAMPLE 2

| Ink Composition | % by weight |
| --- | --- |
| Dye desalted by the use of distilled water | |
| C.I. Direct Black 32 | 4.0 |
| Ethylene glycol | 64.2 |
| Distilled water | 31.2 |
| EDTA-tetra sodium salt | 0.2 |
| Bacillat 35 (Hoechst A.G.) | 0.2 |

Another aqueous ink composition consisting of the above shown components was prepared in the same manner as in Example 1. The viscosity, the surface tension and the specific resistance of the ink composition thus prepared were 7.5 c.p.s., 56 dyn/cm and $1.5 \times 10^4 \Omega.cm$ respectively at normal temperature (25° C.).

Using this ink, ink-jet recording was conducted using the same device and in the same manner as in Example 1 and, similarly as in Example 1, good results were obtained.

Further, even after a long period of storage thereof no growth of a bacteria or mold was observed and no precipitation occurred.

EXAMPLE 3

| Ink Composition | % by weight |
| --- | --- |
| Dye desalted by recrystalization | |
| C.I. Direct Black 32 | 2.0 |
| Tertiary ethylene glycol | 45.0 |
| Distilled water | 51.4 |
| Potassium carbonate | 0.3 |
| EDTA-tetra sodium salt | 0.2 |
| Bacillat 35 (Hoechst AG) | 0.1 |

Another aqueous ink composition consisting of the above shown components was prepared in the same manner as in Example 1. The viscosity, the surface tension and the specific resistance of the ink composition thus prepared were 6.6 c.p.s., 55 dyn/cm and $1.7 \times 10^4 \Omega.cm$ respectively at normal temperature (25° C.).

Using this ink, ink-jet recording was conducted using the same device and in the same manner as in Example 1 and, similarly as in Example 1, good results were obtained.

Further, even after a long period of storage thereof no growth of a bacteria or mold was observed and no precipitation occurred.

EXAMPLE 4

| Ink Composition | % by weight |
| --- | --- |
| Dye desalted by recrystalization | |
| C.I. Direct Blue 25 | 2.0 |
| Dye desalted by recrystalization | |
| C.I. Direct Blue 226 | 2.0 |
| Ethylene glycol | 61.5 |
| Distilled water | 33.9 |
| Potassium carbonate | 0.1 |
| EDTA-tetra sodium salt | 0.3 |
| Bacillat 35 (Hoechst AG) | 0.2 |

Another aqueous ink composition consisting of the above shown components was prepared in the same manner as in Example 1. The viscosity, the surface tension and the specific resistance of the ink composition thus prepared were 6.0 c.p.s., 58 dyn/cm and $1.0 \times 10^4 \Omega.cm$ respectively at normal temperature (25° C.). Using this ink, ink-jet recording was conducted using the same device and in the same manner as in Example 1 and, similarly as in Example 1, good results were obtained.

Further, even after a long period of storage thereof no growth of a bacteria or mold was observed and no precipitation occurred.

EXAMPLE 5

| Ink Composition | % by weight |
|---|---|
| Dye desalted by distilled water C.I. Direct Black 109 | 3.0 |
| Diethylene glycol | 45.0 |
| Distilled water | 51.4 |
| Potassium carbonate | 0.2 |
| EDTA-tetra sodium salt | 0.3 |
| Bacillat 35 (Hoechst AG) | 0.1 |

Another aqueous ink composition consisting of the above shown components was prepared in the same manner as in Example 1. The viscosity, the surface tension and the specific resistance of the ink composition thus prepared were 5.1 c.p.s., 48 dyn/cm and $2.0 \times 10^4 \Omega.cm$ respectively at normal temperature (25° C.).

Using this ink, ink-jet recording was conducted using the same device and in the same manner as in Example 1 and, similarly as in Example 1, good results were obtained.

Further, even after a long period of storage thereof no growth of a bacteria or mold was observed and no precipitation occurred.

We claim:

1. An ink composition for ink-jet recording which is an aqueous solution comprising a water-soluble acid dye, a water soluble direct dye, or mixtures thereof, and a compound selected from the class consisting of a polyhydric alcohol having 1-4 carbon atoms, hexylene glycol, triethylene glycol, di-propylene glycol and 1,2,6-hexane triol, said composition having a viscosity of from 4 to 20 cps, a surface tension of from 40 to 60 dynes/cm and a specific resistance of from $5 \times 10^3$ to $1 \times 10^5 \Omega cm$.

2. An ink composition for ink-jet recording according to claim 1 which consists of an aqueous solution comprising a water-soluble acid dye or direct dye and a polyhydric alcohol containing 1 to 4 carbon atoms, said composition having viscosity of 4 to 20 c.p.s., surface tension of 40 to 60 dyn/cm. and specific resistance of $5 \times 10^3$ to $1 \times 10^5 \Omega.cm$.

3. An ink composition according to claim 1, wherein said dye is selected from a blue or black dye having the solubility in water of more than 0.5% by weight.

4. An ink composition according to claim 3, wherein, said dye is selected from a group consisting of C.I. Acid Blacks No. 2, 7, 24, 52, 107, 118, 119 and 156, C.I. Direct Blacks No. 17, 32, 38 and 51, C.I. Acid Blues No. 9, 62, 102, 104, 113, 117 and 120, and C.I. Direct Blues No. 1, 6, 15, 25, 71, 86 and 226.

5. An ink composition according to claim 1, 3 or 4, wherein said dye is incorporated in said composition at an amount of 0.5 to 8% by weight.

6. An ink composition according to claim 1, wherein said polyhydric alcohol is selected from the group consisting of ethylene glycol, propylene glycol, tri-methylene glycol, glycerol, 1,3-butanediol, 2,3-butanediol, glycol, glycerol, 1,3-butanediol, 2,3-butanediol, 1,4-butanediol, diethylene glycol, 1,5-pentanediol, hexylene glycol, triethylene glycol, dipropylene glycol and 1,2,6-hexanetriol.

* * * * *